(12) United States Patent
Eberhart

(10) Patent No.: US 11,245,349 B2
(45) Date of Patent: Feb. 8, 2022

(54) ELECTRIC DRIVE SYSTEM AND OPERATING METHOD

(71) Applicant: AUDI AG, Ingolstadt (DE)

(72) Inventor: Philipp Eberhart, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 127 days.

(21) Appl. No.: 16/794,477

(22) Filed: Feb. 19, 2020

(65) Prior Publication Data

US 2020/0358387 A1 Nov. 12, 2020

(30) Foreign Application Priority Data

May 9, 2019 (DE) .......................... 102019206704.2

(51) Int. Cl.
*H02P 1/00* (2006.01)
*H02P 27/06* (2006.01)
*B60L 50/60* (2019.01)
*H02M 3/156* (2006.01)
*H02M 7/5387* (2007.01)

(52) U.S. Cl.
CPC .............. *H02P 27/06* (2013.01); *B60L 50/66* (2019.02); *H02M 3/156* (2013.01); *H02M 7/5387* (2013.01); *H02P 2201/11* (2013.01)

(58) Field of Classification Search
CPC ..... H02P 27/06; H02P 2201/11; H02M 3/156; H02M 7/5387; B60L 50/66
See application file for complete search history.

(56) References Cited

U.S. PATENT DOCUMENTS

| 2014/0012446 | A1 | 1/2014 | Kumar et al. | |
| 2021/0101494 | A1* | 4/2021 | Lee | ........................ H02P 27/06 |

FOREIGN PATENT DOCUMENTS

| CN | 108297701 A | * | 7/2018 | .............. H02M 3/04 |
| DE | 4013506 A1 | | 10/1991 | |
| DE | 102011081725 A1 | | 2/2013 | |
| DE | 102018107177 A1 | | 10/2018 | |
| EP | 1 900 602 A1 | | 3/2008 | |
| JP | 2004-166460 A | | 6/2004 | |
| WO | 2019/049299 A1 | | 3/2019 | |

OTHER PUBLICATIONS

Extended European Search Report dated Aug. 20, 2020, including the European Search Report and the European Search Opinion, in connection with corresponding EP Application No. 20168141.8 (12 pp., including machine-generated English translation).
Jih-Sheng Lai, et al., "Energy Management Power Converters in Hybrid Electric and Fuel Cell Vehicles", Proceedings of the IEEE, vol. 95, No. 4, Apr. 2007, pp. 766-777 (12 pp.).
Mohammad Kabalo, et al., "State-of-the-Art of DC-DC Converters for Fuel Cell Vehicles", Vehicle Power and Propulsion Conference (VPPC), Sep. 2010, IEEE, 6 pp.
German Examination Report dated Jan. 16, 2020 in corresponding German Application No. 10 2019 206 704.2; 20 pages; Machine translation attached.
Abwärtswandler (Downward Converters), Wikipedia. Version Feb. 6, 2019. URL: https://de.wikipedia.org/w/index.php?title=Abw%C3%A4rtswandler&oldid=185431200; Feb. 6, 2019; 11 pages; Machine translation attached.

* cited by examiner

*Primary Examiner* — Karen Masih
(74) *Attorney, Agent, or Firm* — Maier & Maier, PLLC

(57) ABSTRACT

A drive system for an electrically driven motor vehicle and a method for operating the drive system, which increases the service life of a power module which is a component of a pulse inverter of the drive system.

10 Claims, 1 Drawing Sheet

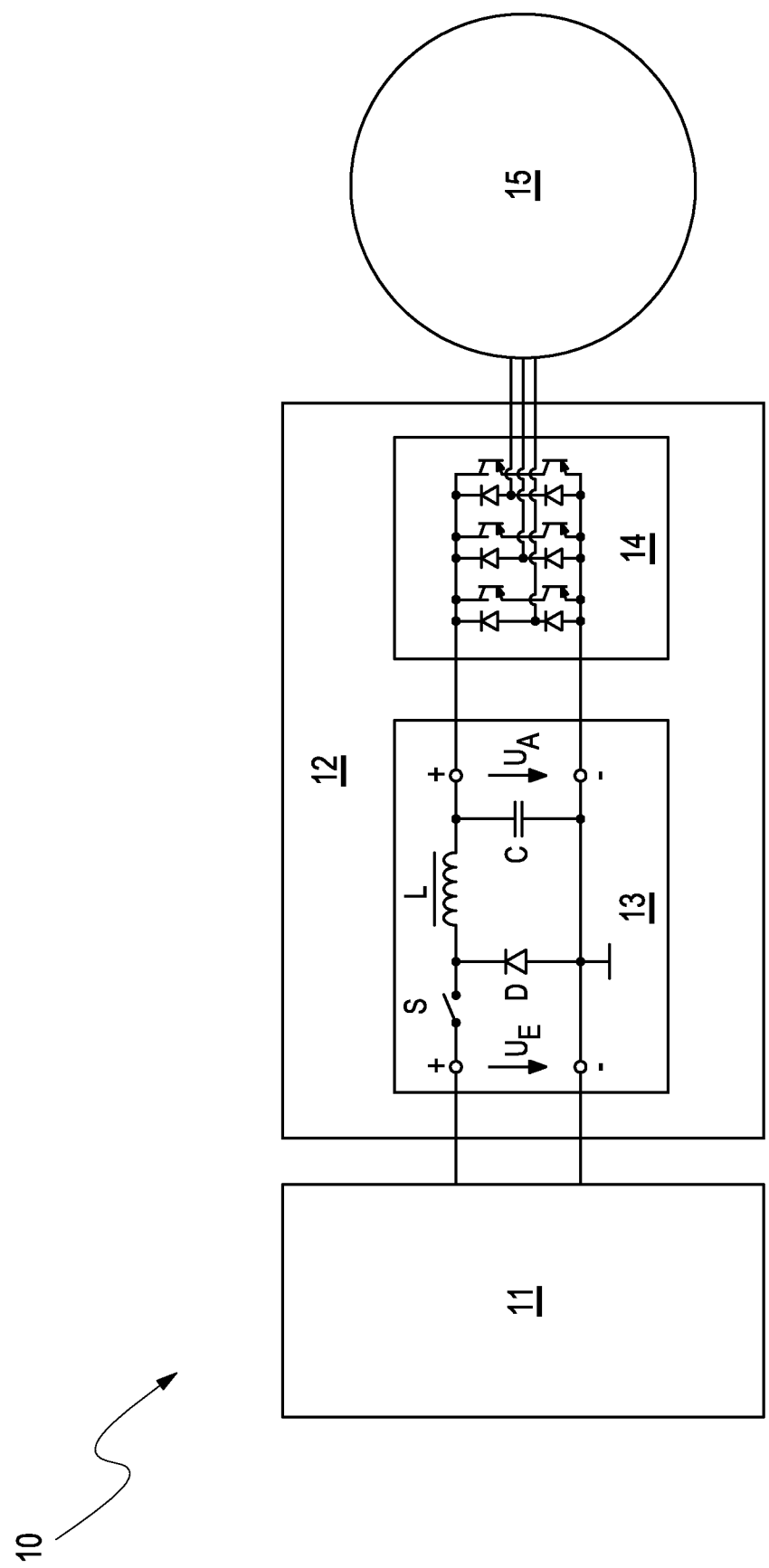

ELECTRIC DRIVE SYSTEM AND OPERATING METHOD

FIELD

The present disclosure relates to a drive system for an electrically driven motor vehicle and to a method for operating the drive system, which increases the service life of a power module which is a component of a pulse inverter of the drive system.

BACKGROUND

During the operation of an electric vehicle or hybrid vehicle, the alternating current for the electric machines of the drive is generated via the power module in a pulse inverter from direct current at battery voltage. During switching of the power semiconductor of the power module, thermomechanical stresses are generated due to losses, stresses which over time can lead to failure of the components. Under certain operating conditions, the service life of the power semiconductor can become shorter than what is necessary to meet the requirements, and the component can fail prematurely.

The aim of the present disclosure is to prevent a premature failure of the power semiconductor of the power module, i.e., to ensure that the service life of the power semiconductor corresponds at least to the specifications for the service life of the drive.

DE 40 13 506 A1 discloses an electric drive system with an optionally chargeable direct current source from which a rotating field machine is supplied via an inverter, with a voltage converter switched between the direct current source and the inverter, in order to increase the inverter input voltage in comparison to the source output voltage and/or in order to lower the source charging voltage in comparison to the voltage which can be tapped from the inverter input.

DE 10 2018 107 177 A1 discloses a drive system for an electric vehicle, wherein an inverter in a power module of the drive is supplied with a supply voltage from a traction battery. Between the traction battery and the inverter, a voltage converter (VVC) is arranged, which transforms the output voltage of the traction battery into a desired reference voltage which is used as input voltage of the inverter. The VVC can increase or "step up" the voltage potential of the electric power which is provided by the traction battery.

DE 10 2011 081 725 A1 discloses a multi-stage charging device for a battery of a battery-operated electric motor. The multi-stage charging device comprises a buck converter, an intermediate circuit and a boost converter, in order to generate a suitable charging direct current from a (single phase or three phase) alternating current provided by a current connection. Here, for the boost converter and the intermediate circuit, components of the electric drive are used: the electric motor functions as intermediate circuit, and the drive converter functions a boost converter. The coupling of the electric motor to the network-side buck converter here occurs in such a manner that at least half of the charging current flows through at least one of the at least three coils of the electric drive.

SUMMARY

The disclosure relates to a drive system for an electrically driven motor vehicle. The drive system comprises at least one HV battery, at least one electric machine operated with alternating current, and a pulse inverter arranged between the HV battery and the electric machine. According to the disclosure, the pulse inverter comprises a buck converter upstream of a power module, which buck converter is configured to convert an input voltage of the pulse inverter into a lower output voltage which is applied at the input of the power module.

In an embodiment, the buck converter comprises a switch, a diode, an inductor and a capacitor. In an embodiment, the switch is implemented as an electronic switch, for example, as a transistor, in particular as IGBT or MOS-FET.

In an embodiment of the drive system, the output voltage of the buck converter, which is applied as input voltage at the inputs of the power module, is 50 to 80%, for example, 55 to 70%, or 55 to 60% of the input voltage of the pulse inverter, i.e., of the input voltage of the buck converter. In an additional embodiment, the output voltage of the buck converter, which is applied as input voltage at the inputs of the power module, is 400 to 600 Volt, for example, 450 to 550 Volt. In another embodiment of the drive system, the output voltage of the buck converter, which is applied as input voltage to the inputs of the power module, is 200 to 300 Volt.

In an embodiment of the drive system, the input voltage of the pulse inverter, i.e., the input voltage of the buck converter, is 800 to 1000 Volt, for example, 850 to 950 Volt. In another embodiment of the drive system, the input voltage of the pulse inverter, i.e., the input voltage of the buck converter, is 350 to 500 Volt.

The disclosure also relates to a method for increasing the service life of a power module in a pulse inverter of a drive system for an electrically driven motor vehicle.

According to the disclosure, an input voltage of the pulse inverter, which is provided by an HV battery and which corresponds to the output voltage of the HV battery, is decreased to a lower voltage which is applied at the input of the power module. Thus, the direct current voltage applied to the power semiconductors is decreased.

In an embodiment of the method, the input voltage of the pulse inverter is decreased by means of a buck converter to the lower voltage. The lower voltage which was lowered to the optimal voltage value (which is determined by the applied switching frequency, among other factors), is used as input voltage of the power module which contains the power semiconductors.

In an embodiment of the method, the lower voltage is 50 to 80%, for example, 55 to 70%, or 55 to 60% of the input voltage. In another embodiment, the lower voltage is 400 to 600 Volt, for example, 450 to 550 Volt. In another embodiment, the lower voltage is 200 to 300 Volt.

In an embodiment of the method, the input voltage of the pulse inverter is 800 to 1000 Volt, for example, 850 to 950 Volt. In another embodiment of the method, the input voltage of the pulse inverter is 350 to 500 Volt.

Current studies show that, due to the lowering of the input voltage of the power module to less than the output voltage of the HV battery, the service life of the power semiconductors can be significantly increased.

Additional advantages and designs of the disclosure result from the description and the attached drawing.

It is understood that the aforementioned features to be explained below can be used not only in the respective indicated combination, but also in other combinations or individually, without leaving the scope of the present disclosure.

BRIEF DESCRIPTION OF THE DRAWINGS

The disclosure is represented diagrammatically based on an embodiment in the drawing and is described in greater detail in reference to the drawing. In the drawing:

FIG. 1 shows a diagrammatic representation of an embodiment of the drive system according to the disclosure.

FIG. 1 diagrammatically shows an embodiment of the drive system 10 according to the disclosure. The terminals of an HV battery 11 are connected to the inputs of a pulse inverter 12 which comprises a power module 14 and a buck converter 13 which is upstream of the power module 14. The outputs of the power module 14 are connected to an electric machine 15 which is supplied with electric energy by the pulse inverter 12. The buck converter 13 reduces the input voltage $U_E$ which corresponds to the output voltage of the HV battery 11, to a lower output voltage $U_A$ which is applied at the input of the power module 14. Due to the decreased input voltage, the service life of the components of the power module 14 is increased.

In an example, the input voltage $U_E$ (the output voltage of the HV battery 11) was 850 V. At a switching frequency of 4 kHz, when the voltage $U_A$ applied at the input of the power module 14 was lowered from 850 V to 500 V, an increase of the service life of the semiconductors in the power module 14 by a factor of approximately 2 in comparison to a power module operated at 850 V was observed.

The invention claimed is:

1. A drive system for an electrically driven motor vehicle, comprising:
at least one high-voltage battery, at least one electric machine operated with alternating current for driving the electrically driven motor vehicle, and a pulse inverter arranged between the high-voltage battery and the electric machine,
wherein the pulse inverter comprises a buck converter provided upstream of a power module, and the buck converter is configured to convert an input voltage of the pulse inverter into a lower output voltage which is applied at the input of the power module,
wherein the input voltage is between 800 and 1000 Volts.

2. The drive system according to claim 1, wherein the buck converter includes a switch, a diode, an inductor and a capacitor.

3. The drive system according to claim 1, wherein the output voltage is between 50% and 80% of the input voltage.

4. A method for increasing the service life of electrical components in an electrically driven motor vehicle, comprising:
decreasing an input voltage of a pulse inverter arranged between a high-voltage battery and at least one electric drive for driving the electrically driven motor vehicle, the pulse inverter comprising a converter provided upstream of a power module,
wherein the input voltage is decreased to a lower voltage which is applied at the input of the power module,
wherein the lower voltage is between 50% and 80% of the input voltage.

5. The method according to claim 4, wherein the converter is a buck converter.

6. The method according to claim 4, wherein the input voltage is between 800 and 1000 Volts.

7. The method according to claim 4, wherein the input voltage is between 350 and 500 Volts.

8. A drive system for an electrically driven motor vehicle, comprising:
at least one high-voltage battery, at least one electric machine operated with alternating current for driving the electrically driven motor vehicle, and a pulse inverter arranged between the high-voltage battery and the electric machine,
wherein the pulse inverter comprises a buck converter provided upstream of a power module, and the buck converter is configured to convert an input voltage of the pulse inverter into a lower output voltage which is applied at the input of the power module,
wherein the lower voltage is approximately 59% of the input voltage.

9. The drive system according to claim 8, wherein the input voltage is between 800 and 1000 Volts.

10. The drive system according to claim 8, wherein the input voltage is 850 Volts.

* * * * *